United States Patent
Milya (10) Patent No.: US 9,626,494 B2
(45) Date of Patent: *Apr. 18, 2017

(54) METHOD AND SYSTEM FOR ENCRYPTION AND/OR DECRYPTION

(71) Applicant: Vorsz One PTE. LTD., Singapore (SG)

(72) Inventor: Ajie Milya, Kalimantan Selatan, ID (US)

(73) Assignee: VORSZ ONE PTE. LTD, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/550,554

(22) Filed: Nov. 21, 2014

(65) Prior Publication Data

US 2015/0169855 A1 Jun. 18, 2015

(30) Foreign Application Priority Data

Dec. 12, 2013 (SG) ................................ 201309305-9

(51) Int. Cl.
*G06F 12/14* (2006.01)
*G06F 21/31* (2013.01)

(52) U.S. Cl.
CPC .................................. *G06F 21/31* (2013.01)

(58) Field of Classification Search
CPC ....... H04L 63/083; G06F 21/35; G06F 21/31; G06F 2221/2111; G06F 17/30386; H04B 5/0031; H04B 5/0056

USPC .......................................................... 726/19
See application file for complete search history.

(56) References Cited

U.S. PATENT DOCUMENTS

| | | | |
|---|---|---|---|
| 2003/0208562 A1* | 11/2003 | Hauck .................... | H04L 63/08 709/219 |
| 2005/0273625 A1* | 12/2005 | Dayan .................... | G06F 21/31 713/184 |
| 2007/0101152 A1* | 5/2007 | Mercredi ................ | G06F 21/34 713/185 |

* cited by examiner

*Primary Examiner* — Brian Shaw
(74) *Attorney, Agent, or Firm* — Cowan, Liebowitz & Latman, P.C.; Steven D. Underwood (57) ABSTRACT

Disclosed is a method which comprises receiving a user input which includes a password component and a non-password component that is defined by a user, the non-password component is arranged relative to the password component in a random manner determined by the user; verifying a presence of a pre-assigned password within the user input, wherein the pre-assigned password is associated with the user and stored in a first database; and based on the verified presence of the pre-assigned password within the received user input, identifying the non-password component. This way, even if a third party has full view of the user input entry, the visitor would be unable to discover the password and additional information individually.

11 Claims, 5 Drawing Sheets

METHOD AND SYSTEM FOR ENCRYPTION AND/OR DECRYPTION

TECHNICAL FIELD

The present disclosure relates to encryption and/or decryption technology, particularly to method and system for encryption and/or decryption of a password.

BACKGROUND

Passwords are used to authenticate the identity of a user and control access of information. However, technology advancement, e.g. a Google glass with a forward-facing camera, enables detection or cracking of passwords even if the password used is complex and difficult to remember.

This risk of password detection is increased in circumstances where the password is entered in the presence of a third party who is not privy to the password. For example, a host user may be required to enter a password in the presence of a visiting staff to verify service attendance or duration. The host user may be further required to enter the password into a mobile device belonging to the visiting staff. In these circumstances, it is imperative to prevent the password from being discovered and reused without authorization.

SUMMARY OF THE INVENTION

According to one aspect of the invention, there is provided a method and a system for encrypting a password to prevent the password from being discovered and reused without authorization. This method comprises: generating a password component from a plurality of characters of a pre-assigned password which is associated with a user; and randomly inserting a non-password component into the generated password component, wherein the non-password component includes at least one variable character. The system comprises a computing device comprising a memory and a processor device communicatively coupled to the memory, and configured to execute program code stored in the memory, the program code comprising an encryption module configured to conduct the encryption method.

In one embodiment of the present invention, the pre-assigned password includes a plurality of sub-passwords, each sub-password having a plurality of characters provided in a predefined sequence, wherein generating a password component includes: dividing each sub-password into a plurality of subsets, wherein randomly inserting a non-password component includes: interposing the subsets of one sub-password with the subsets of at least another sub-password, wherein an aggregation of the interposed subsets of each sub-password conforms to the corresponding defined sequence of the each sub-password.

In another embodiment of the invention, the pre-assigned password includes a plurality of characters in a non-defined sequence, and wherein generating a password component includes generating a random permutation of the plurality of characters.

According to another aspect of the invention, there is also provided a method and system for decrypting a password which is encrypted using the method described in the invention. This method comprises: receiving a user input which includes a password component and a non-password component that is defined by a user or a user device, the non-password component is arranged relative to the password component in a random manner; verifying a presence of a pre-assigned password within the user input, wherein the pre-assigned password is associated with the user and stored in a first database; and based on the verified presence of the pre-assigned password within the user input, identifying the non-password component. The system comprises: a computing device comprising a memory and a processor device communicatively coupled to the memory, and configured to execute program code stored in the memory, the program code comprising a verification module configured to conduct the verification process in the decryption method.

In order to further enhance the security of the password, in one embodiment of the invention, the decryption method further comprises: ascertaining a validity of the user input by comparing the non-password component against a second database which includes a plurality of historical non-password components of the user; and establishing the user input is valid and storing the non-password component in the second database if the non-password component does not correspond to any of the plurality of historical non-password components.

Alternatively, the decryption method further comprises: ascertaining a validity of the user input by comparing the user input against a third database which includes a plurality of historical user inputs of the user; and establishing the user input is valid and storing the user input in the third database if the user input does not correspond to any of the plurality of historical user inputs.

BRIEF DESCRIPTION OF THE DRAWINGS

The invention will be described in detail with reference to the accompanying drawings, in which.

DETAILED DESCRIPTION OF PREFERRED EMBODIMENTS

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

According to one aspect of the invention, a method for encrypting a password comprises: generating a password component from a plurality of characters of a pre-assigned password which is associated with a user; and randomly inserting a non-password component into the generated password component, wherein the non-password component includes at least one variable character, e.g. a number, or an alphabet. The number of characters in the non-password component may also be variable.

According to another aspect of the invention, a decryption method comprises: receiving a user input which includes a password component and a non-password component that is defined by a user or a user device, where the non-password component is arranged relative to the password component in a random manner; verifying a presence of a pre-assigned password within the received user input, where the pre-assigned password is associated with the user and stored in a first database; and based on the verified presence of the pre-assigned password within the user input, further identifying the non-password component. It is to be appreciated that the user input may include a password encrypted by the encryption method described according to the first aspect of the invention.

Figure 1:
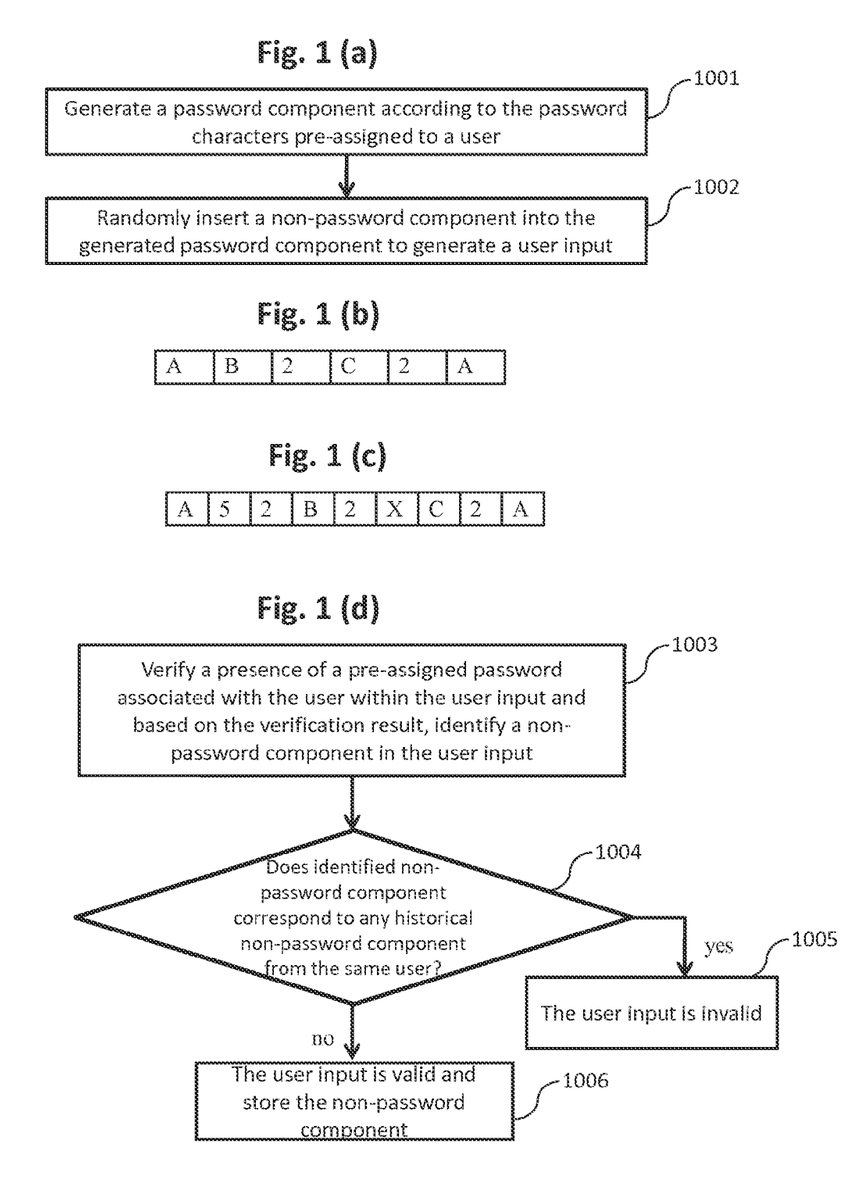
FIG. 1(a) is a flowchart showing an encryption method according to a first embodiment of the invention.
FIG. 1(b) shows one example of a generated password component according to the first embodiment.
FIG. 1(c) shows one example of an encrypted password by randomly inserting a non-password component into the generated password component of FIG. 1(b) according to the first embodiment.
FIG. 1(d) is a flowchart showing a decryption method according to the first embodiment.

In a first embodiment of the invention, the pre-assigned password associated with a user includes a plurality of characters provided in a non-defined sequence. Particularly, the pre-assigned password may be a list of password characters that can be rearranged in any random permutation or a principle for generating a password component. For example, the pre-assigned password may be a list of password characters containing two 'A's, one 'B', two '2's and one 'C' that can be arranged in any sequence. Based on this example, an encryption method or method for generating a user input according to this embodiment as illustrated in FIG. 1(a) may take place as described below.

In block 1001, a password component is generated from the password characters pre-assigned to a user. One example of the generated password component is 'AB2C2A' as shown in FIG. 1(b).

In block 1002, a non-password component is randomly inserted into the generated password component to generate a user input. The non-password component may include any random character, such as numbers or alphabets, and the number of characters of the non-password component is variable. For example, the non-password component includes three characters '52X' which may be entirely inserted at any position preceding, within or following the generated password component 'AB2C2A'.

Alternatively, the non-password component may be divided into two or more subsets, and each of the subsets may be randomly inserted at adjacent or non-adjacent positions in the generated password component. In the example shown in FIG. 1(c), a non-password component '52X' is divided into two subsets, '52' and 'X', and the subsets are inserted at non-adjacent positions within the generated password component 'AB2C2A', specifically, '52' is inserted in between characters 'A' and 'B', 'X' is inserted in between characters '2' and 'C'.

For enhanced security, each non-password component may only be used one time within a predetermined time period, to prevent the user input from being detected by other persons and reused without authorization.

In certain applications, the non-password component may include certain predetermined information, e.g. feedback information about a service quality, or amount of monetary reward, etc. In such applications, the sequence of characters within the non-password component is critical and therefore, during the random insertion of the non-password component, the characters must be arranged in a sequence to reflect the intended information, e.g. feedback content or value, determined by the user. In the example shown in FIG. 1(c), if '52' of the non-password component represents the amount of monetary reward, the sequence of the inserted characters '5' and '2' needs to remain in this order to ensure accurate identification of the monetary reward.

When a user input generated according to the first aspect of the invention is received at a verification system, a decryption or verification process according to the second aspect of the invention as illustrated in FIG. 1(d) may take place as described below.

In block 1003, the received user input is verified for a presence of a pre-assigned password associated with the user within the received user input, and based on the verified presence of the pre-assigned password within the user input, a non-password component subsisting in the user input is identified.

To implement block 1003, a pre-assigned password which is associated with the user and stored in a first database may be retrieved for comparison against the user input. If the pre-assigned password is a list of password characters provided in a non-defined sequence, e.g. the password must include two 'A's, one 'B', two '2's and one 'C' in any sequence, the user input is checked whether it includes all characters of the pre-assigned password regardless of the character sequence. If a presence of all characters within the received user input is verified, a non-password component subsisting in the user input is accordingly identified.

In block 1004, the validity of the user input is ascertained, by comparing the identified non-password component against a second database which stores historical non-password components of the same user. If the identified non-password component corresponds to any of the historical non-password components stored in the second database, the user input is determined to be invalid (block 1005) and the decryption or verification process fails. If the identified non-password component does not correspond to any of the historical non-password components, the received user input is determined to be valid (block 1006) and thus the user input passes the verification process. The identified non-password component may then be stored in the second database. The purpose of block 1004 is to enhance the security level of the method of the invention.

In certain embodiments, instead of validating the user input by comparing the identified non-password component against the historical non-password components as described in the above paragraph, validating the user input may be made by comparing the received user input against the historical user inputs which are stored in a third database. Accordingly, block 1004 may be modified in which the received user input, in its entirety, is compared against the historical user inputs received from the same user. If a received user input corresponds to any one of the historical user inputs, the verification process fails. If the received user input does not correspond to any of the historical user inputs, the verification process succeeds. This procedure is optional and can enhance the security level of the method of the invention. Even if a previously-entered user input is detected and re-used, in its entirety, on a separate occasion, the above-described procedure would prevent the unauthorized user from passing the verification process.

If the non-password component includes or represents some pre-determined information, e.g. feedback on service quality or monetary reward, in order to ensure the non-password component is different on every occasion according to the above-described optional procedure, the non-password component may further include at least one variable or random character of different nature. For example, if the predetermined information relates to five levels of service quality represented by alphabetical characters 'A' to 'E', numerical character may be added to the non-password component, e.g. '5B' or 'A2'.

In the above description, it is to be appreciated that the first database, second database and/or third database may be stored in the verification system or a remote device which is capable of exchanging data with the verification system.

Figure 2:
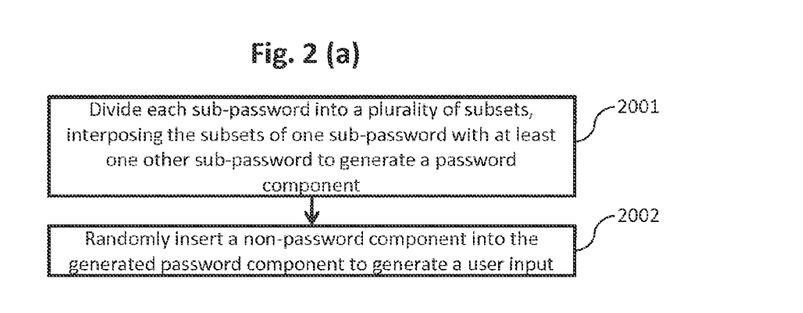
FIG. 2(a) is a flowchart showing an encryption method according to the second embodiment of the invention.
FIG. 2(b) shows an example of a password pre-assigned to a user according to the second embodiment.
FIG. 2(c) shows one example of a generated password component according to the second embodiment.
FIG. 2(d) shows one example of an encrypted password by randomly inserting a non-password component into the generated password component of FIG. 2(c) according to the second embodiment.
FIG. 2(e) shows another example of an encrypted password by randomly inserting a non-password component into the generated password component of FIG. 2(c) according to the second embodiment.
FIG. 2(f) is a flowchart showing a decryption method according to the second embodiment.

According to a second embodiment of the invention, the pre-assigned password associated with a user includes at least two sub-passwords. Each sub-password has a plurality of characters arranged in a predefined sequence. For example, as shown in FIG. 2(b), the password includes two sub-passwords and the first sub-password includes six characters 'P11', 'P12', 'P13', 'P14', 'P15' and 'P16' arranged in a first predefined sequence, the second sub-password includes six characters 'P21', 'P22', 'P23', 'P24', 'P25' and 'P26' arranged in a second predefined sequence. Based on this example, an encryption method or method for generating a user input according to this embodiment as illustrated in FIG. 2(a) may take place as described below.

In block 2001, each sub-password is divided into a plurality of subsets, each subset including at least one character of the sub-password. The subsets of one sub-password may be interposed with the subsets of at least another sub-password to generate a password component, wherein an aggregation of the interposed subsets of each sub-password conforms to the corresponding predefined sequence of the each sub-password.

An example to illustrate block 2001 is shown in FIG. 2(c). The first sub-password shown in FIG. 2(b) is divided into three subsets: the first subset having the first two characters 'P11' and 'P12', the second subset having the next two characters 'P13' and 'P14', and the third subset having the last two characters 'P15' and 'P16'. The second sub-password shown in FIG. 2(b) is divided into two subsets: the first subset having the first three characters 'P21', 'P22' and 'P23' and the second subset having the next three characters 'P24', 'P25' and 'P26'. The three subsets of the first sub-password are interposed with the two subsets of the second sub-password to provide a generated password component (see FIG. 2(c)). Within the generated password component, the aggregated three subsets of the first sub-password conform to the corresponding predefined sequence of the first sub-password; similarly, the aggregated two subsets of the second sub-password conform to the corresponding predefined sequence of the second sub-password.

It should be noted that if the pre-assigned password includes more than two sub-passwords, each sub-password may be interposed with at least one other sub-password, i.e. the plurality of subsets of each sub-password are interposed with the plurality of subsets of at least another sub-password, wherein an aggregation of the subsets corresponding to each sub-password conform to the corresponding predefined sequence of the each sub-password.

In block 2002, a non-password component is randomly inserted into the generated password component to generate a user input. The non-password component may be inserted at any position relative to the generated password component, including preceding, within and/or following the password component. As shown in the example of FIG. 2(d), a non-password component 'F11', 'F12' and 'F13' as a whole is inserted in between characters 'P24' and 'P25'.

Alternatively, the non-password component may be divided into a plurality of subsets, and each subset may be inserted at adjacent or non-adjacent positions in the generated password component. As shown in the example of FIG. 2(e), a non-password component having three characters 'F11', 'F12' and F13' is divided into two subsets, the first subset having characters 'F11' and 'F12', the second subset having characters 'F13'. As shown in FIG. 2(e), the first subset is inserted between characters 'P22' and 'P23', and the second subset is inserted between characters 'P24' and 'P25'.

In certain applications, as described in the foregoing, the sequence of characters within the non-password component is critical and, therefore, during the random insertion of the non-password component, the characters must be sequenced to reflect the intended information or feedback content. Also as described in the foregoing, the non-password component may be used only one time within a predetermined time to enhance security.

When a user input generated according to this embodiment e.g. as illustrated in FIG. 2(e), is received at a verification system, a decryption or verification process according to the second aspect of the invention as illustrated in FIG. 2(f) may take place as described below.

In a verification system, the pre-assigned password, including the sub-passwords, is stored in a first database for retrieval. In block 2003, the received user input is compared with the pre-assigned password, including sub-passwords, to verify a presence of each sub-password within the user input and to identify a non-password component within the user input. As each sub-password includes a plurality of characters arranged in a predefined sequence, therefore, the step of verifying a presence of a pre-stored password includes verifying a presence of all of the plurality of characters of each sub-password within the user input and verifying an aggregation of the verified characters corresponding to each sub-password conforms to the corresponding predefined sequence of the each sub-password.

If any of the sub-passwords included in the pre-stored password is absent from the received user input, the verification process fails. By identifying the sub-passwords of the pre-assigned password from the user input, the non-password component is also identified.

To implement block 2003 with reference to the example of FIG. 2(b) where the pre-assigned password includes a first and a second sub-password, a presence of the first sub-password within the received user input may be verified first. If the first sub-password is present, the first sub-password may be subtracted from the user input. Next, a presence of the second sub-password within the remaining user input may be verified and if the second sub-password is present, it is subtracted from the remaining user input. This verification procedure may continue if there are third or subsequence sub-passwords. When all sub-passwords have been verified as present within the user input, the verification process succeeds or passes. By verifying and subtracting the identified sub-passwords from the user input, the non-password component is identified therefrom. If any sub-password is absent from the user input, the verification process fails.

In block 2004, the identified non-password component is compared against a second database which stores a plurality of historical non-password components of the same user. If the identified non-password component corresponds to any of the historical non-password components, the received user input is determined to be invalid and the verification process fails (block 2005); if the identified non-password component does not correspond to any of the historical non-password components, the received user input is valid (block 2006) and the user input passes the verification process. Accordingly, the identified non-password component is stored in the second database. The second database may include all historical non-password components received from the same user, or only those received within a predetermined time period.

In certain embodiments, instead of validating the user input by comparing identified non-password component against the historical non-password components as described in the above paragraph, validating the user input may be made by comparing the received user input against the historical user inputs.

The present disclosure also provides a system for encrypting a password according to the method for encrypting a password explained above. The system comprises a computing device which comprises a memory and a processor which is communicatively coupled to the memory. The processor is configured to execute program code stored in the memory, wherein the program code comprises an encryption module configured to generate a password component from a plurality of characters of the pre-assigned password, and randomly insert a non-password component into the generated password component, wherein the non-password component includes at least one variable character.

According to the first embodiment, the pre-assigned password associated with the user includes a plurality of characters in a non-defined sequence, wherein the encryption module is configured to generate a password component which includes a random permutation of the plurality of characters.

According to the second embodiment, the pre-assigned password associated with the user includes a plurality of sub-passwords, each sub-password having a plurality of characters provided in a predefined sequence, wherein the encryption module is further configured to divide each sub-password into a plurality of subsets, interpose the subsets of one sub-password with the subsets of at least another sub-password, wherein an aggregation of the interposed subsets of each sub-password conforms to the corresponding defined sequence of the each sub-password.

The non-password component includes at least one variable character to reflect an evaluation of a service rendered between the check-in time and the check-out time and/or a monetary value determined by the user. If the non-password component includes a plurality of variable characters, the plurality of variable characters may be randomly inserted at non-adjacent positions in the generated password component. If a plurality of variable characters are used to reflect predetermined information, e.g. feedback information or a monetary value, these variable characters should be arranged in a sequence which the pre-determined information can be accurately reflected.

In certain embodiments, the pre-assigned password or at least one of the pre-assigned sub-passwords associated with a user may be generated by a pre-set system or device, e.g. a key token, SMS (Short Message Service), or other electronic devices. The generated password or sub-password(s) is known to both the associated user side, e.g. the system for encrypting the password, and the verification system. If at least one of the sub-passwords is generated using this way, the generated sub-password(s) is used together with other pre-assigned sub-password(s) to generate a password component of the user input. Even the non-password component may be generated by a pre-set system or device, except that in certain embodiments, the non-password component may include some predetermined information which must be determined by the user.

Figure 3:
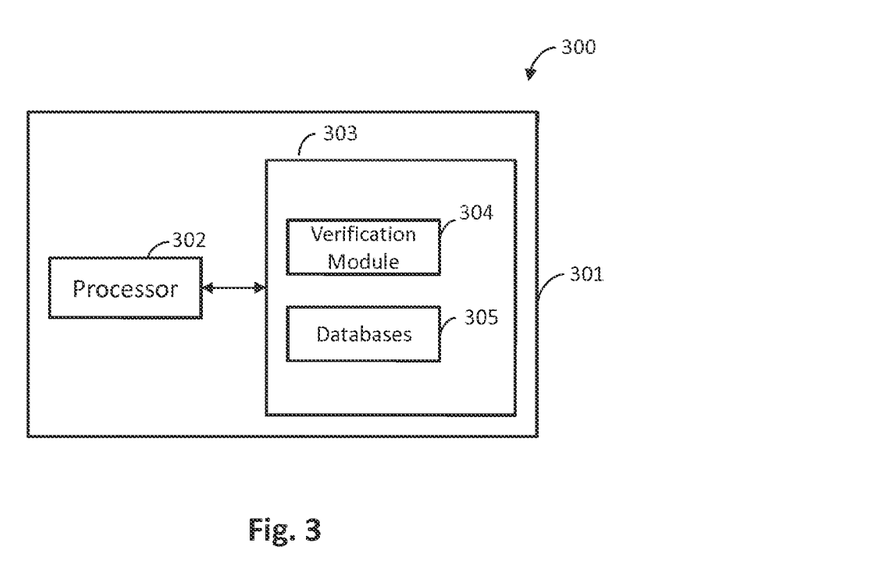
FIG. 3 is a block diagram illustrating a system for decrypting a user input according to one embodiment of the invention.

The present disclosure also provides a system for decrypting or verifying a user input. An example system 300 is illustrated in FIG. 3 and may include a computing device 301 which comprises a processor 302 and a memory 303. The processor 302 is communicatively coupled to the memory 303 and configured to execute program code stored in the memory 303. In this example, the program code stored in the memory 303 at least includes a verification module 304 which is configured to verify a presence of a pre-assigned password within a user input which includes a password component and a non-password component. This non-password component may be determined by a user or a user device. The non-password component is arranged relative to the password component in a random manner, wherein the pre-assigned password is stored in a first database and associated with the user or the user device. Furthermore, based on the verified presence of the pre-assigned password within the user input, the non-password component within the user input can be identified.

For enhanced security, the verification module 304 in the computing device 301 may be further configured ascertain a validity of the user input by comparing the non-password component against a second database in which a plurality of historical non-password components of the user are stored; establish the user input is valid if the non-password component does not correspond to any of a plurality of historical non-password components of the user, which are stored in a second database, and store the non-password component in the second database.

Alternatively, for enhanced security, the verification module 304 may be further configured to ascertain a validity of the user input by comparing the input user against a third database which includes a plurality of historical user inputs of the user, establish the user input is valid if the user input does not correspond to any of the plurality of historical user inputs, and store the user input in the third database.

It is to be appreciated that both the first database for storing the pre-assigned password associated with the user and the second database for storing the historical non-password components of the user may be stored in the memory 303 of the computing device 301 as part of the databases 305. In addition, the third database for storing the historical user inputs of the user may also be stored in the memory 303 as part of the databases 305.

According to the first embodiment of the invention, the pre-assigned password may include a plurality of characters provided in a non-defined sequence, and then the verification module 304 may be further configured to: verify a presence of all the plurality of characters of the pre-assigned password in the user input.

According to the second embodiment of the invention, the pre-assigned password may include a plurality of sub-passwords, each sub-password including a plurality of characters provided in a predefined sequence, and then the verification module may be further configured to: verify a presence of all of the plurality of characters of each sub-password within the user input, and verify an aggregation of the verified characters corresponding to each sub-password conforms to the corresponding predefined sequence of the each sub-password.

While FIG. 3 illustrates a system 300 embodied in a single computing device 301, it is to be appreciated that certain modifications may be made without departing from the scope of the invention. For example, one or more of the first, second and third databases may be located at a separate device, e.g. remote server, which can be communicatively coupled to the computing device 301. It is also to be appreciated that the system 300 of FIG. 3 or modifications thereof may be suitable to implement encryption methods as described in the present disclosure.

An exemplary application will be explained below to further illustrate the encryption and/or decryption method according to embodiments of the invention.

In this example, the encryption and decryption methods are combined with Near Field Communications (NFC) technology to verify presence of a visitor at a host user location, record the presence duration, and transfer feedback information, e.g. service quality and/or monetary reward, from the host user without divulging the feedback information even if entry of the feedback information by the host user took place in full view of the visitor.

In this example, a non-removable NFC tag is provided fixedly coupled to each desired location. Each non-removable NFC tag has a unique identifier (ID) associated with the location hosting the tag. Any tempering of the non-removable NFC tag will render it unreadable. In this example, at least one mobile device is provided, the mobile device being provided with a custom application and NFC tag reader to implement the methods for verifying presence of a visitor.

Figure 4:
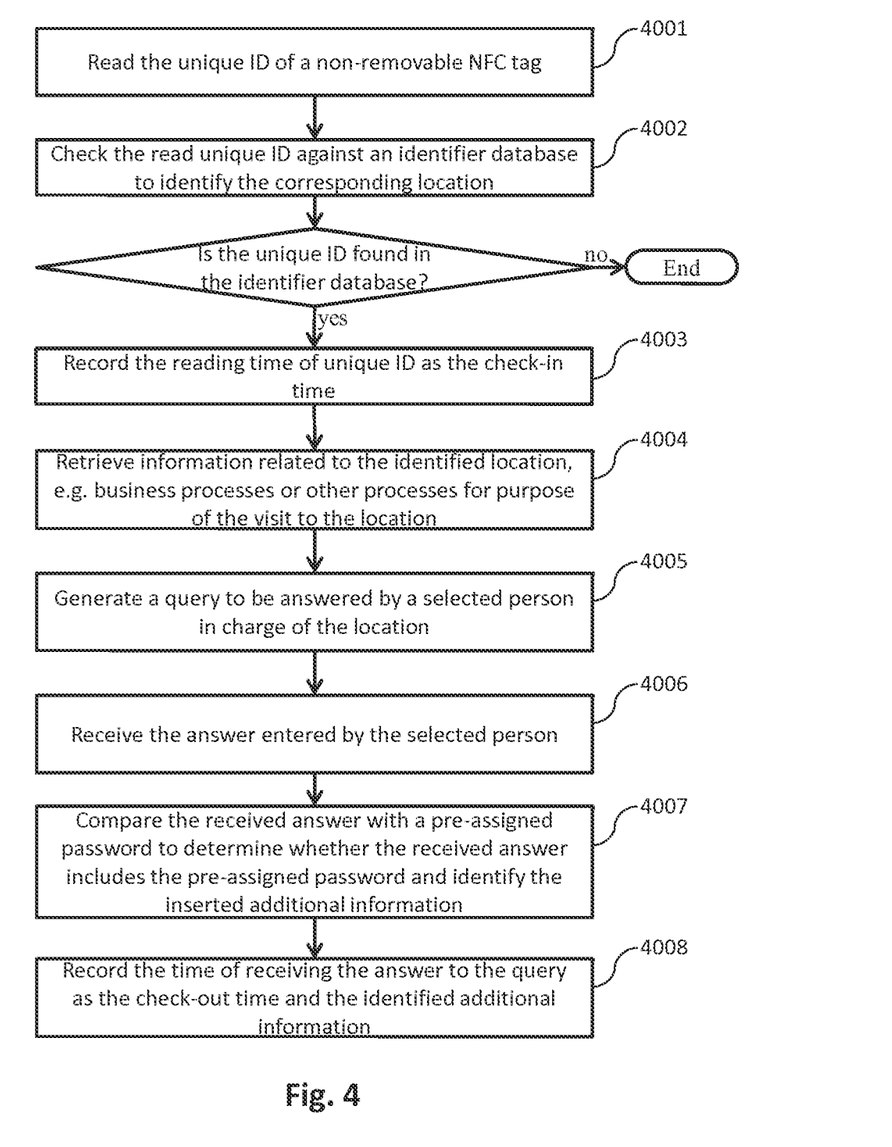
FIG. 4 is a flowchart illustrating a method for verifying presence of a visitor according to one embodiment of the invention.

According to one embodiment of the present invention, the method for verifying presence of a visitor includes the following sequence as shown in FIG. 4.

In block 4001, the unique identifier of a non-removable NFC tag is read by the NFC tag reader. The NFC tag reader may be provided in a mobile device and controlled by a custom application in the mobile device. Since each non-removable NFC tag has a unique identifier associated with a particular location where it is permanently fixed, the reading of the unique identifier of a non-removable NFC tag is unique to the particular location.

In block 4002, the read unique identifier is checked against an identifier database to identify the location corresponding to the unique identifier. The identifier database stores the unique identifiers of various locations. If the read unique identifier does not correspond to any of the stored identifiers in the identifier database, the sequence ends; if the read unique identifier corresponds to one of the stored identifiers in database, the location corresponding to the read unique identifier is identified.

This identifier database can be stored in a memory of the mobile device or external of the mobile device, e.g. a remote server. In the latter case, the mobile device may be connected to the remote server by wired or wireless connections to allow data exchange between the remote server and the mobile device.

In block 4003, the time of reading the unique identifier is recorded as the check-in time. The check-in time and the corresponding identified location may be stored in the mobile device or a separate remote database which can be communicatively coupled to the mobile device.

In block 4004, information related to the identified location, for example, about business processes or other processes for purpose of the visit to the location may be retrieved from a memory of the mobile device or a separate remote storage. This is an optional step. Information for retrieval may relate to Customer Relationship Management, sales call, delivery, or other processes that are predetermined for purpose of the visit.

In block 4005, at the end of visitation, e.g. after completing the business process for purpose of the visit to the location, a security and feedback query is generated or retrieved by the custom application. This query must be answered by a selected person in charge of the visited location. The query may requests for entry of a pre-assigned password belonging to the selected person and, optionally, additional information, e.g. service quality feedback or monetary reward from the selected person. If the selected person in charge of the visited location is not available, a preset temporary answer from another designated person may be used to answer the query.

In block 4006, an answer (or user input) from the selected person in response to the query is entered or received at the mobile device.

To prevent the pre-assigned password and additional information from being detected by the visitor, the answer is generated by randomly inserting the additional information (or "non-password component") into the pre-assigned password (or "password component" generated based on the pre-assigned password). Various methods for encrypting the answer have been described in the embodiments in the foregoing paragraphs to prevent the visitor from discovering the pre-assigned password and the additional information individually.

For example, the answer to the query may be generated according to the method disclosed in the first embodiment, where the pre-assigned password is a list of characters provided in an undefined sequence, e.g. password must include two 'A's, one 'B' and one 'C'. An example of a password component randomly generated from the pre-assigned password is 'CBAA'. Additional information is randomly inserted into the generated password component for enhanced security and transfer of predetermined information. For example, a feedback on service quality is represented one of five levels represented by numerals 'A' to 'E'. Assuming the selected person would like to rank the service quality of the visitor at 'C', a 'C' is randomly inserted into the generated password component 'CBAA', and then the answer to query becomes 'CBCAA'.

In another example, the answer to the query may be generated according to the method disclosed in the second embodiment, where the pre-assigned password includes a plurality of sub-passwords, each sub-password includes a plurality of subsets arranged in a defined sequence, and each subset including at least one character. A password component is generated by interposing the subsets of one sub-password with the subsets of another sub-password. The generated password component includes all of the sub-passwords, with the subsets within each sub-password being arranged in the corresponding defined sequence. After that, the answer to the query is generated by randomly inserting additional information into the generated password component.

If the pre-assigned password includes three sub-passwords: first sub-password is '123456', second sub-password is '234567', third sub-password is 'abcdef', the additional information to be inserted is a monetary reward of 100 dollars. As an illustrative example, the second sub-password as a whole is firstly inserted in between two subsets of the first sub-password: one subset being '123', the other subset being '456', to generate a string '123234567456'. Thereafter, the third sub-password is divided into three subsets: the first subset being 'ab', the second subset being 'cde', and a third subset being 'f', and then the three subsets are randomly inserted into the string '123234567456' to generate a password component, e.g. '12ab3234cde5674f56'. After the password component is generated, the additional information '100' which is divided into three subsets: '1', '0' and '0' is randomly inserted into the password component to generate the answer to the query. One example of the final generated answer is '12a1b3234c0de05674f56'. This way, even if the visitor has a full view of the answer entered by the selected person, the visitor would be unable to discover the pre-assigned password and monetary reward individually.

Referring to the sequence of FIG. 4, after the answer to the query is entered by the selected person, a preset algorithm installed in the mobile device or a remote server is activated to verify the password and identify the inserted additional information.

In block 4007, the received answer (or user input) is compared with a pre-assigned password which is stored in a database to determine whether the received answer includes the pre-assigned password and identify the inserted additional information.

Following from the above example where the received answer is 'CBCAA', the pre-stored password is the list of password characters provided in an undefined sequence, e.g. two 'A's, one 'B' and one 'C', the algorithm checks the characters of the received answer to determine whether the received answer includes two 'A's, one 'B' and one 'C' as required. After the presence of the pre-assigned password is verified, the additional information is identified, which is "C".

Following from another above example where the received answer is '12a1b3234c0de05674f56', the pre-assigned password includes three sub-passwords: first sub-password '123456', second sub-password '234567' and third sub-password 'abcdef', the algorithm verifies whether all of the sub-passwords can be identified from the received answer. If anyone of the sub-passwords cannot be identified from the received answer, the verification process fails. Once all of the sub-passwords are identified from the received answer, the additional information is also identified.

Referring to the sequence of FIG. 4, in block 4008, if a presence of the pre-assigned password is verified within the received answer, the time of receiving the answer to the query is recorded as the check-out time. The identified additional information may also be identified and recorded.

Both the check-out time and the identified additional information may be stored in the mobile device or at a remote database. The check-in time recorded in block 4003 and the check-out time recorded in block 4008 may be used to calculate duration of presence. Optionally, the check-in time recorded in block 4003 may also be recorded at block 4008, i.e. after the verification of the password succeeds or passes. The check-in time, check-out time, corresponding location identified by the read unique identifier and any additional information may be stored in the mobile device or a remote database for future retrieval.

Figure 5:
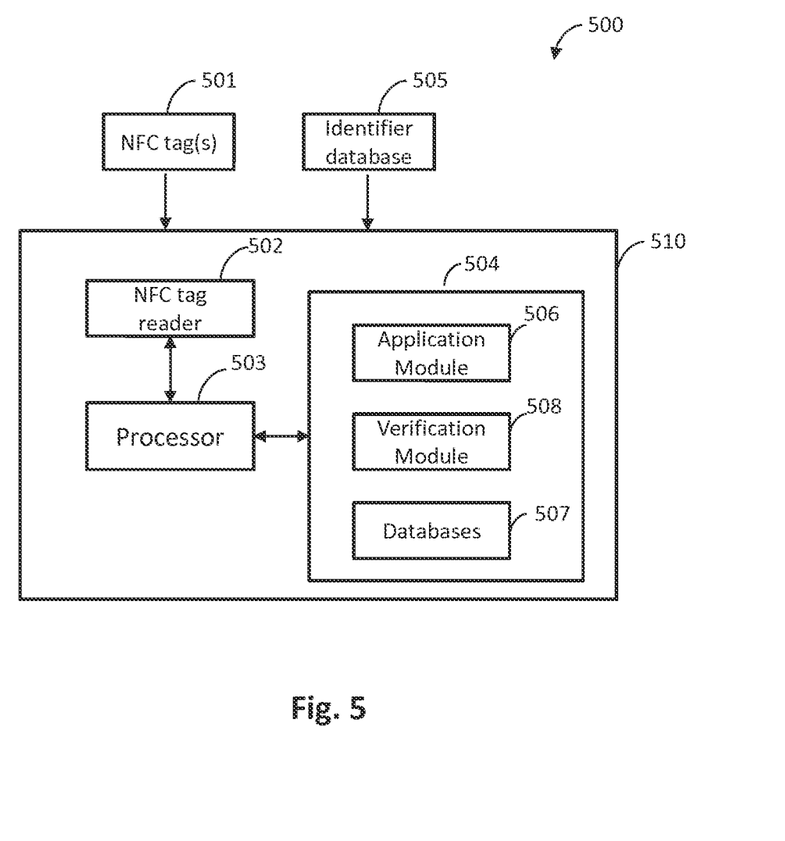
FIG. 5 is a block diagram illustrating a system for verifying presence of a visitor according to one embodiment of the invention.

FIG. 5 is a block diagram illustrating a system 500 for verifying presence, comprising at least one non-removable NFC tag 501 and a NFC-enabled device 510. The NFC-tag 501 is fixedly coupled to a location and assigned an identifier associated with the location. This identifier is stored in the memory of the NFC-tag 501. The NFC-enabled device 510 comprises a NFC-tag reader 502, a processor 503 and a memory 504. The NFC-tag reader 502 is coupled to or integrated in the NFC-enabled device 510 for reading the identifier from the NFC-tag 501. The processor 503 is communicatively coupled to the NFC tag reader 502 and the memory 504, and configured to execute program code stored in the memory 504. The program code stored in the memory 504 comprises an application module 505 which is configured to: cause the NFC-tag reader 502 read the NFC-tag 501 to retrieve the identifier stored in the NFC-tag 501; verify the read identifier against an identifier database 505 to verify the location corresponding to the received identifier; in the identifier database, a comparison table which shows the relationship between the identifier and the location is stored; generate a query based on the verified location; receive a user input in response to the query; record a time of reading the identifier as a check-in time; and record a time of receiving the answer as a check-out time. Furthermore, the application module 506 can be configured to calculate the duration of presence based on the check-in time and check-out time. It is to be appreciated that identifier database 505 may be stored in the memory 504 as part of the databases 507.

In order to enhance the security of the verification of presence, the encryption and decryption of a password method is combined with the NFC-technology. According to certain embodiments of the invention, the user input entered by a user in charge of the location includes a password component and a non-password component. The non-password component is defined by the user or a user device, the non-password component is arranged relative to the password component in a random manner, the system for verification of presence further comprises a verification module 508 which is configured to verify a presence of a pre-assigned password within the user input and identify the non-password component based on the verified presence of the pre-assigned password within the received user input, wherein the pre-assigned password is stored in a first database and associated with the user. It is to be appreciated that the verification module 508 may be stored in the memory 504 of the NFC-enabled device 510, or in a remote server which can be communicatively coupled to the NFC-enabled device 510. The first database may be part of the databases 507 in the memory 504 or stored in a remote server which can be communicatively coupled to the NFC-enabled device 510.

In some embodiments, the non-password component may include at least one variable character to reflect an evaluation of a service rendered between the check-in time and the check-out time or a monetary reward value determined by the user.

In order to further enhance the security of the verification of presence, the verification module 508 may be further configured to: ascertain a validity of the user input by comparing the non-password component against a second database which includes a plurality of historical non-password components from the user, establish the user input is valid if the non-password component does not correspond to any of the plurality of historical non-password components, and store the non-password component in the second database. It should be noted that the second database also may be part of the databases 507 in the memory 504 or stored in a remote server which can exchange data with the NFC-enabled device 510.

Alternatively, the verification module 508 may be further configured to: ascertain a validity of the received user input by comparing the received user input against a third database which includes a plurality of historical user inputs from the same user, establish the received user input is valid if it does not correspond to any of the plurality of historical user inputs, and store the received user input in the third database. It should be noted that the third database also may be part of the databases 507 in the memory 504 or stored in a remote server which can exchange data with the NFC-enabled device 510.

According to the first embodiment, the pre-assigned password may include a plurality of characters provided in a non-defined sequence, and wherein the verification module 508 may be further configured to: verify a presence of all the plurality of characters of the pre-assigned password in the received user input.

According to the second embodiment, the pre-assigned password may include a plurality of sub-passwords, each sub-password including a plurality of characters provided in a predefined sequence, wherein the verification module 508 may be further configured to: verify a presence of all of the plurality of characters of each sub-password within the user input, and verify an aggregation of the verified characters corresponding to each sub-password conforms to the corresponding predefined sequence of the each sub-password.

Clearly, the system illustrated in FIG. 5 combines a decryption system as illustrated in FIG. 3 with a NFC-enabled system which includes a NFC-tag (s), a NFC-tag reader attached to or incorporated in the computing device and an application module stored in the memory and executed by the processor of the computing device.

It is to be appreciated that certain modifications may be made to the system illustrated in FIG. 5 without departing from the scope of the invention. For example, the identifier database and any other databases may be located in the memory of the NFC-enabled device 510.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary, with the invention being defined by the appended claims.

The invention claimed is:

1. A method comprising:
receiving a user input which includes a password component and a non-password component that is defined by a user or a user device, wherein the non-password component includes a plurality of characters which are arranged relative to the password component in a random manner and at least some of the plurality of characters are arranged in a predefined sequence to reflect a predetermined information determined by the user, wherein the number of characters in the non-password component is variable and the predetermined information comprises at least one of feedback information about a service quality or amount of monetary reward;

verifying a presence of a pre-assigned password within the user input, wherein the pre-assigned password is associated with the user and stored in a first database; and based on the verified presence of the pre-assigned password within the user input, identifying the non-password component.

2. The method of claim 1, further comprising:
ascertaining a validity of the user input by comparing the non-password component against a second database which includes a plurality of historical non-password components of the user; and establishing the user input is valid and storing the non-password component in the second database if the non-password component does not correspond to any of the plurality of historical non-password components.

3. The method of claim 1, wherein the pre-assigned password includes a plurality of characters provided in a non-defined sequence, and wherein verifying a presence of a pre-assigned password includes verifying a presence of all the plurality of characters of the pre-assigned password in the user input.

4. The method of claim 1, wherein the pre-assigned password includes a plurality of sub-passwords, each sub-password including a plurality of characters provided in a predefined sequence,
wherein verifying a presence of a pre-assigned password includes verifying a presence of all of the plurality of characters of each sub-password within the user input and verifying an aggregation of the verified characters corresponding to each sub-password conforms to the corresponding predefined sequence of the each sub-password.

5. A non-transitory computer readable medium encoded with program code operable, when loaded on a computer, to effect the method of claim 1.

6. A system comprising:
a computing device comprising a memory and a processor device communicatively coupled to the memory, and configured to execute program code stored in the memory, the program code comprising:
a verification module configured to:
verify a presence of a pre-assigned password within a user input which includes a password component and a non-password component that is defined by a user or a user device, wherein the non-password component includes a plurality of characters which are arranged relative to the password component in a random manner and at least some of the plurality of characters are arranged in a predefined sequence to reflect a predetermined information determined by the user, wherein the number of characters in the non-password component is variable and the predetermined information comprises at least one of feedback information about a service quality or amount of monetary reward, wherein the number of characters in the non-password component is variable and the predetermined information comprises at least one of feedback information about a service quality or amount of monetary reward, and wherein the pre-assigned password is stored in a first database and associated with the user or the user device, and identify the non-password component based on the verified presence of the pre-assigned password within the user input.

7. The system of claim 6,
wherein the verification module is further configured to:

ascertain a validity of the user input by comparing the non-password component against a second database in which a plurality of historical non-password components of the user are stored, establish the user input is valid if the non-password component does not correspond to any of the historical non-password components of the user, and store the non-password component in the second database.

8. The system of claim 7, wherein the first database and the second database are stored in the memory of the computing device.

9. The system of claim 6, wherein the pre-assigned password includes a plurality of characters provided in a non-defined sequence, and wherein the verification module is further configured to:

verify a presence of all the plurality of characters of the pre-assigned password in the user input.

10. The system of claim 6, wherein the pre-assigned password includes a plurality of sub-passwords, each sub-password including a plurality of characters provided in a predefined sequence, wherein the verification module is further configured to:

verify a presence of all of the plurality of characters of each sub-password within the user input, and verify an aggregation of the verified characters corresponding to each sub-password conforms to the corresponding predefined sequence of the each sub-password.

11. The system of claim 6, wherein the verification module is further configured to:

ascertain a validity of the user input by comparing the input user against a third database in which a plurality of historical user inputs of the user are stored, establish the user input is valid if the user input does not correspond to any of the plurality of historical user inputs, and store the user input in the third database.

* * * * *